(12) United States Patent
Ronyak

(10) Patent No.: US 6,987,207 B1
(45) Date of Patent: Jan. 17, 2006

(54) HYDROCARBONACEOUS COMPOSITION

(76) Inventor: Alan Jeffrey Ronyak, 5134 N. 200th Ave., Litchfield Park, AZ (US) 85340

( * ) Notice: Subject to any disclaimer, the term of this patent is extended or adjusted under 35 U.S.C. 154(b) by 0 days.

(21) Appl. No.: 11/071,787

(22) Filed: Mar. 3, 2005

(51) Int. Cl.
*C09D 195/00* (2006.01)

(52) U.S. Cl. .............. 585/3; 106/273.1; 106/278; 106/279; 106/280; 106/285

(58) Field of Classification Search ........... 585/2, 585/3; 106/273.1, 278, 279, 280, 285
See application file for complete search history.

(56) References Cited

U.S. PATENT DOCUMENTS

| | | | |
|---|---|---|---|
| 5,271,767 A | 12/1993 | Light, Sr. et al. | 106/246 |
| 5,362,316 A | 11/1994 | Paradise | 106/278 |
| 6,461,421 B1 | 10/2002 | Ronvak | 106/285 |
| 6,764,542 B1 * | 7/2004 | Lackey et al. | 106/277 |
| 2004/0025745 A1 * | 2/2004 | Freisthler | 106/266 |
| 2004/0195150 A1 * | 10/2004 | Kiser et al. | 208/23 |
| 2004/0220295 A1 * | 11/2004 | Timcik et al. | 523/102 |

OTHER PUBLICATIONS

USB United Soybean Board; "Soy Methyl Ester Solvents Technical Background"; (Feb. 2002.)
Henneberry; "Solvent Alternatives"; Clean Tech Central, (Sep. 2004.)

* cited by examiner

*Primary Examiner*—David Brunsman
(74) *Attorney, Agent, or Firm*—Renner, Otto, Boisselle & Sklar, LLP

(57) ABSTRACT

The present invention relates to a composition, comprising: (A) an odor-emitting hydrocarbonaceous material; and (B) an odor-suppressing amount of an additive composition comprising soy methyl ester, at least one aldehyde and/or at least one ketone, and at least one carboxylic acid ester in addition to the soy methyl ester.

10 Claims, No Drawings

HYDROCARBONACEOUS COMPOSITION

TECHNICAL FIELD

This invention relates to hydrocarbonaceous compositions, and more particularly to hydrocarbonaceous compositions containing odor suppressants.

BACKGROUND

The need for odor reduction in hydrocarbonaceous materials such as asphalt, (including roofing asphalt and paving asphalt), distillate fuels, and the like, is well known. For example, fumes from asphalt can cause irritation of the eyes and mucous membranes of the nose and throat. Further, exposure to asphalt fumes may give some people headaches or make them nauseated. All of these effects typically go away once the person is no longer exposed to the fumes, and pose no known long-term health consequences. However, the overall effect of asphalt fumes can reduce worker productivity and increase the number of sick days an employee takes. Furthermore, these unpleasant odors often generate adverse reactions and complaints from near-by residents. These complaints can result in demands for asphalt plants to relocate, restrict activities or shut down the operation.

SUMMARY

This invention relates to a composition, comprising: (A) an odor-emitting hydrocarbonaceous material; and (B) an odor-suppressing amount of an additive composition comprising soy methyl ester, at least one aldehyde and/or at least one ketone, and at least one carboxylic acid ester in addition to the soy methyl ester.

DETAILED DESCRIPTION

Component (A), the odor-emitting hydrocarbonaceous material, may comprise any hydrocarbonaceous material that emits, at ambient temperatures or elevated temperatures, undesirable or objectionable odors. These include roofing asphalts, paving asphalts, distillate fuels, and the like. The hydrocarbonaceous materials may be based on one or more natural oils, synthetic oils, or a combination thereof. The hydrocarbonaceous materials may contain one or more volatile (at ambient or elevated temperatures) components such as aliphatic or aromatic hydrocarbons (e.g., methane, ethane, propane, butane, pentane, hexane, benzene, and the like).

The natural oils may include animal oils and vegetable oils (e.g., castor oil, lard oil) as well as mineral oils such as liquid petroleum oils and solvent treated or acid-treated mineral oils of the paraffinic, naphthenic or mixed paraffinic-naphthenic types. Oils derived from coal or shale may be included. Synthetic oils may include hydrocarbon oils such as polymerized olefins, alkylbenzenes, polyphenyls, alkylated diphenyl ethers, alkylated diphenyl sulfides, and the like. Synthetic oils may include alkylene oxide polymers, esters of dicarboxylic acids, silicon-based oils, and the like.

Unrefined, refined and rerefined oils, either natural or synthetic (as well as mixtures of two or more of any of these) of the type disclosed herein above may be included. Unrefined oils are those obtained directly from a natural or synthetic source without further purification treatment. For example, a shale oil obtained directly from retorting operations, a petroleum oil obtained directly from primary distillation or ester oil obtained directly from an esterification process and used without further treatment would be an unrefined oil. Refined oils are similar to the unrefined oils except they have been further treated in one or more purification steps to improve one or more properties. Many such purification techniques are known to those skilled in the art such as solvent extraction, secondary distillation, acid or base extraction, filtration, percolation, etc. Rerefined oils are obtained by processes similar to those used to obtain refined oils applied to refined oils which have been already used in service. Such rerefined oils are also known as recycled, reclaimed or reprocessed oils and often are additionally processed by techniques directed to removal of spent additives and oil breakdown products.

The term "asphalt" as used herein refers to any of a variety of solid or semisolid materials at room temperature which gradually liquify when heated, and in which the predominant constituents are naturally occurring bitumens of which are obtained as residue in petroleum refining. Asphalt is further defined by Kirk-Othmer, Encyclopedia of Chemical Technology, Vol. 3, Third Ed. (1978) pp. 284–327, John Wiley & Sons, New York. An additional discussion appears in the publication entitled "A Brief Introduction to Asphalt and some of its Uses", Manual Series No. 5 (MS-5), The Asphalt Institute, 7th Ed., September, 1974. Both of these references are incorporated herein by reference.

The asphalts which may be treated in accordance with this invention may comprise natural asphalt, petroleum asphalt, or a mixture thereof. These may be used for roofing applications, paving applications, and the like. The natural asphalts may include, for example, asphaltite such as gilsonite, grahamite and glance pitch; lake asphalt such as trinidad asphalt; rock asphalt; or a mixture of two or more thereof. The petroleum asphalts may include straight asphalt obtained by distillation of a crude oil (unblown and substantially unoxidized), blown asphalt produced by blowing an oxygen-containing gas into a straight asphalt in the presence or absence of a catalyst, solvent-extracted asphalt obtained when asphaltic material is separated from the petroleum fraction containing it by the use of propane or other solvents, and cut-back asphalt which is a mixture of straight asphalt and a light petroleum solvent. The asphalts may include petroleum tar and asphalt cement. The petroleum tars may include oil gas tar obtained as a by-product when gases are produced from petroleum fractions, such tar in refined form, cut-back tar obtained by mixing a light petroleum fraction with such tar, and tar pitch obtained as a residue by removing the volatile fraction from such tar. Any of these kinds of asphalt may be used singly or jointly. Straight asphalt may be useful for paving applications, and oxidized and blown asphalts may be useful for roofing applications.

The asphalt cements that may be useful may be characterized by a penetration (PEN, measured in tenths of a millimeter, dmm) of less than 400 at 25° C., and a typical penetration is between 40 and 300 (ASTM Standard, Method D-5). The viscosity of asphalt cement at 60° C. is typically more than about 65 poise.

The asphalt compositions of the present invention may be useful for preparing asphalt coating compositions. These include aggregate-containing asphalts such as employed in the paving of roads, bridges, airport runways, sidewalks, etc. The asphalt compositions of the present invention may be mixed with aggregate while in a fluid or molten condition. The asphalt composition may be mixed with preheated, predried aggregates to form a homogeneous mixture of uniformly coated aggregates which may be used to form a paving composition. This mixing procedure may be performed at an asphalt mixing plant. The aggregate may be heated under conditions of time and temperature that are sufficient to drive off essentially all free moisture prior to mixing. During mixing, both the aggregate and the inventive asphalt composition may be at temperatures of about 100° C. to about 160° C. Before the resulting composition is cooled to a temperature at which it loses its workability, it may be spread on a road bed, for example, and then compacted and permitted to cure. After curing, the resulting paving composition may comprise aggregate bound by a matrix of asphalt binder.

The asphalt compositions of the present invention may be useful for preparing seal coats. A seal coat may be applied as a hot asphalt, cutback asphalt or emulsified asphalt. The seal coat may be applied at a rate of about 0.05 to about 0.8 gallons per square yard of surface. In one embodiment, the application rate may be about 0.35 gallons per square yard of surface. The molten or fluid asphalt may be sprayed, for example, from a truck. The aggregate may be placed on top of the asphalt. Rolling or compacting the aggregate into the asphalt may be used to finish the application.

The asphalt compositions of the present invention, after formation, may be handled by conventional techniques to maintain them in fluid or molten form under, for example, roofing or road-building conditions. For example, the asphalts may be formed into a cutback by fluxing the asphalt with a suitable volatile solvent or distillate. The asphalt cutback may then be directly mixed with aggregate and applied as a paving composition in fluid form, possibly at ambient temperatures. Another conventional technique for fluidizing the asphalt prior to mixing with aggregate and forming into a paving composition may be to emulsify the asphalt by known techniques. An advantage of this method of fluidizing is that after mixing with the aggregate, it may be applied as a paving composition at ambient temperature.

The term "aggregate" as used herein is intended to include solid particles having a range of sizes including fine particles such as sand to relatively coarse particles such as crushed stone, gravel or slag. For example, the breakdown of Texas pea gravel aggregate may be as follows:

| Gradation | (% Passing) |
|---|---|
| ½" | 100 |
| ⅜" | 98 |
| #4 | 71 |
| #10 | 46 |
| #40 | 30 |
| #80 | 7.8 |
| #200 | 1.0 |

The above aggregate may have a composition of 52.5% Pea Gravel, 14.3% screenings and 28.6% sand.

The ratio of aggregate to asphalt may depend upon their properties and the desired end use. For typical road paving compositions, the paving composition may comprise a minimum of about 85% by weight of aggregate, and generally between about 90% to about 96% by weight of the total paving composition may be aggregate.

The distillate fuels contemplated herein include middle distillate fuels such as gasoline, fuel oils including Nos. 1, 2 and 3 fuel oils used in heating and as diesel fuel oils, turbine fuels, jet fuels, and the like. The base stock may comprise straight chains or branched chains of paraffins, cycloparaffins, olefins, aromatic hydrocarbons, or mixtures thereof. The base stock may contain mixtures of hydrocarbons boiling in the gasoline boiling range. The base stock may be derived from straight run naphtha, gasoline, catalytically cracked or thermally cracked hydrocarbons, or catalytically cracked reformed stock. The base stock may be a straight-run distillate fuel oil or a catalytically (including hydrocracked) or thermally cracked distillate fuel oil. The base stock may be treated in accordance with well-known commercial methods, such as acid or caustic treatment, dehydrogenation, solvent refining, clay treatment, and the like. The distillate fuel may be a recycled fuel oil. The distillate fuel compositions may contain any of the additives generally employed in distillate fuel compositions. These include detergents, anti-knock compounds, anti-icing additives, upper cylinder and fuel pump lubricity additives, corrosion inhibitors, extreme pressure agents, low temperature property modifiers, and the like.

Component (B), the odor-suppressing additive composition of the present invention, may comprise soy methyl ester, at least one aldehyde and/or at least one ketone, and at least one carboxylic acid ester in addition to the soy methyl ester.

The term "soy methyl ester" may refer to a compound derived from soybean oil and methanol. In one embodiment, the soy methyl ester may comprise a compound produced by the transesterification of soybean oil with methanol. Soybean oil may be obtained from soybeans, for example, by solvent extraction. In one embodiment, soybean oil may comprise about 26% by weight triglycerides of oleic acid, about 49% by weight triglycerides of linoleic acid, about 11% by weight triglycerides of linolenic acid, about 14% by weight triglycerides of saturated acids, less than about 1% by weight of free fatty acids, about 1.5–4% by weight of phospholipids (lecithin), and about 0.8% by weight of stigmasterol, sitosterols and tocopherols. The transesterification of soybean oil with methanol to produce soy methyl ester may involve reacting soybean oil with methanol in the presence of a catalyst. The catalyst may be sodium hydroxide, although other catalysts may be used. The reaction may cause the separation of soy oil into soy methyl ester and glycerin. The soy methyl ester may go through a water-wash process wherein water adheres to any impurities, causing the impurities to be filtered from the soy methyl ester. The soy methyl ester may be dried through a vacuum drying system creating the finished product. Soy methyl ester may be biodegradable. Soy methyl ester may be referred to as methyl soyate.

The term "hydrocarbyl" group is used to refer to a group having one or more carbon atoms directly attached to the remainder of a molecule and having a hydrocarbon or predominantly hydrocarbon character. Examples include:

(1) purely hydrocarbon groups, that is, aliphatic (e.g., alkyl, alkenyl or alkylene), and alicyclic (e.g., cycloalkyl, cycloalkenyl) groups, aromatic groups, and aromatic-, aliphatic-, and alicyclic-substituted aromatic groups, as well as cyclic groups wherein the ring is completed through another portion of the molecule (e.g., two substituents together forming an alicyclic group);

(2) substituted hydrocarbon groups, that is, hydrocarbon groups containing non-hydrocarbon groups which do not alter the predominantly hydrocarbon nature of the group (e.g., halo, hydroxyl, alkoxy, mercapto, alkylmercapto, nitro, nitroso, sulfoxy, and the like);

(3) hereto substituted hydrocarbon groups, that is, hydrocarbon groups containing substituents which, while having a predominantly hydrocarbon character contain atoms other than carbon in a ring or chain otherwise composed of carbon atoms. Heteroatoms may include sulfur, oxygen, and nitrogen.

The aldehydes that may be used include compounds represented by the formula

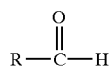

(I)

wherein in formula (I), R is hydrogen, a hydrocarbyl group or a hydroxy substituted hydrocarbyl group. The hydrocarbyl groups and the hydroxy substituted hydrocarbyl groups may contain from 1 to about 25 carbon atoms, and in one embodiment about 6 to about 18 carbon atoms, and in one embodiment about 6 to about 12 carbon atoms.

Examples of useful aldehydes may include formaldehyde, acetaldehyde, propionaldehyde, n-butyraldehyde, n-valeraldehyde, caproaldehyde, acrolein, tran-2-cis-6-nonadienal, n-heptylaldehyde, trans-2-hexenal, hexadeconal, phenylacetaldehyde, o-tolualdehyde, m-tolualdehyde, p-tolualdehyde, salicylaldehyde, p-hydroxybenzaldehyde, anisaldehyde, piperonal, vanillin, benzaldehyde, and mixtures of two or more thereof. In one embodiment, the aldehyde may comprise benzaldehyde, vanillin, or a mixture thereof.

The ketones that may be useful include compounds represented by the formula

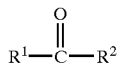

(II)

wherein in formula (II), $R^1$ and $R^2$ independently are hydrocarbyl groups or hydroxy substituted hydrocarbyl groups, or $R^1$ and $R^2$ are linked together to form a cyclic group or a hydroxy-substituted cyclic group. In one embodiment, $R^1$ and $R^2$ independently contain from 1 to about 25 carbon atoms. In one embodiment, $R^1$ contains from about 6 to about 18 carbon atoms, and $R^2$ contains from about 1 to about 25 carbon atoms.

Examples of useful ketones may include acetone, methyl ethyl ketone, diethyl ketone, 2-pentanone, 3-pentanone, 2-hexanone, 3-hexanone, methyl isobutyl ketone, t-butyl methyl ketone, cyclopentanone, cyclohexanone, methyl vinyl ketone, mesityl oxide, biacetyl, acetylacetone, acetophenone, propiophenone, n-butyrophenone, benzophenone, hydroxymethylpyrone, and mixtures of two or more thereof. In one embodiment, the ketone may comprise acetophenone.

The carboxylic acid esters that, in addition to soy methyl ester, may be useful include those esters represented by the formula

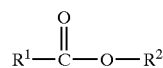

(III)

wherein in formula (III), $R^1$ and $R^2$ independently are hydrocarbyl groups or hydroxy substituted hydrocarbyl groups. In one embodiment, $R^1$ and $R^2$ independently contain from 1 to about 25 carbon atoms, and in one embodiment from 1 to about 18 carbon atoms, and in one embodiment from 1 to about 12 carbon atoms, and in one embodiment from 1 to about 6 carbon atoms.

Examples of the carboxylic acid esters include methyl acetate, ethylacetate, propylacetate, butyl acetate, n-pentyl acetate, amyl acetate, benzyl acetate, phenyl acetate, ethyl formate, ethyl acetate, ethyl propionate, ethyl butyrate, ethyl valerate, ethyl stearate, ethylphenyl acetate, ethyl benzoate, allyl caproate, amyl butyrate, benzyl butyrate, methyl anthranilate, methyl salicylate, or a mixture of two or more thereof. In one embodiment, carboxylic acid ester may comprise methyl anthranilate, benzyl acetate, benzyl butyrate, amyl butyrate, methyl salicylate, or a mixture of two or more thereof.

Component (B) may contain from about 30% to about 90% by weight, and in one embodiment from about 45% to about 80% by weight, and in one embodiment from about 50% to about 75% by weight of soy methyl ester. Component (B) may contain from about 10% to about 50% by weight, and in one embodiment from about 10% to about 40% by weight, and in one embodiment from about 15% to about 35% by weight of the aldehyde and/or ketone. Component (B) may contain from about 1% to about 30% by weight, and in one embodiment about 5% to about 20% by weight, and in one embodiment about 8% to about 18% by weight of the carboxylic acid ester.

The inventive compositions may comprise an odor-emitting hydrocarbonaceous material (A), and an odor-suppressing amount of the additive composition (B). In one embodiment, the hydrocarbonaceous material (A) may comprise a paving asphalt. The concentration of the additive composition (B) in the hydrocarbonaceous material (A) may be from about 0.1 to about 20 gallons of additive composition (B) per 12,000 gallons of hycrocarbonaceous material (A). In one embodiment, this concentration may be from about 0.5 to about 10 gallons of additive composition (B) per 12,000 gallons of hydrocarbonaceous material (A), and in one embodiment from about 0.5 to about 5 gallons of additive composition (B) per 12,000 gallons of hydrocarbonaceous material (A). In one embodiment, the concentration may be from about 0.5 to about 3 gallons of additive composition (B) per 12,000 gallons of hydrocarbonaceous material (A), and in one embodiment from about 0.5 to about 2 gallons of additive composition (B) per 12,000 gallons of hydrocarbonaceous material (A), and in one embodiment about 1 gallon of additive composition (B) per 12,000 gallons of hydrocarbonaceous material (A).

In one embodiment, the hydrocarbonaceous material (A) comprises a roofing asphalt. The concentration of additive composition (B) in the hydrocarbonaceous material (A) may be from about 0.1 to about 20 gallons of additive composition (B) per 6,000 gallons of hydrocarbonaceous material (A). In one embodiment, this concentration may be from about 0.5 to about 10 gallons of additive composition (B) per 6,000 gallons of hydrocarbonaceous material (A), and in one embodiment from about 0.5 to about 5 gallons of additive composition (B) per 6,000 gallons of hydrocarbonaceous material (A). In one embodiment, the concentration may be from about 0.5 to about 3 gallons of additive composition (B) per 6,000 gallons of hydrocarbonaceous material (A), and in one embodiment from about 0.5 to about 2 gallons of additive composition (B) per 6,000 gallons of hydrocarbonaceous material (A), and in one embodiment about 1 gallon of additive composition (B) per 6,000 gallons of hydrocarbonaceous material (A).

Additive composition (B) may be blended into the hydrocarbonaceous material (A) using mixing procedures known in the art. The hydrocarbonaceous material may be in a fluid or molten condition during mixing. The additive composition (B) may be added either by in-line injecting the composition directly at the refinery or by adding the composition (B) into an empty tank and mixing in the hydrocarbonaceous material (A). When the hydrocarbonaceous material is a paving asphalt, the mixing temperature may be in the range from about 250° F. (121° C.) to about 350° F. (177° C.), and in one embodiment from about 300° F. (149° C.) to about 340° F. (171° C.). When the hydrocarbonaceous material is a roofing asphalt, the mixing temperature maybe in the range from about 350° F. (177° C.) to about 480° F. (249° C.), and in one embodiment from about 380° F. (193° C.) to about 450° F. (232° C.).

An advantage of the present invention is that by virtue of the use of additive composition (B), the odor that is characteristic of the odor-emitting hydrocarbonaceous materials (A) may be significantly reduced or eliminated. This may be evidenced by smell. While not wishing to be bound by theory, it is believed that in one embodiment, the odor reduction or elimination results from a reduction or elimination in the emissions of volatile hydrocarbon materials in the hydrocarbonaceous material. In one embodiment, it is believed that the additive composition (B), when mixed with the hydrocarbonaceous material (A), exhausts all the oxygen available in the mixture and thus stops the oxidation process. Without the oxidation process sulfur fumes may not form, resulting in the reduction or elimination of odor.

Example 1
The following mixture is prepared:

|  | wt % |
|---|---|
| Methyl Salicylate | 0.70% |
| Acetophenone | 1.40% |
| Benzyl Butyrate | 1.75% |
| Amyl Butyrate | 3.40% |
| Vanillin | 3.40% |
| Methyl Anthranilate | 5.00% |
| Benzyl Acetate | 6.75% |
| Benzaldehyde | 27.60% |
| Soy Methyl Ester | 50.00% |

Example 2
The following mixture is prepared:

|  | wt % |
|---|---|
| Methyl Salicylate | 0.30% |
| Acetophenone | 0.65% |
| Benzyl Butyrate | 0.85% |
| Amyl Butyrate | 1.70% |
| Vanillin | 1.70% |
| Methyl Anthranilate | 2.60% |
| Benzyl Acetate | 3.40% |
| Benzaldehyde | 13.80% |
| Soy Methyl Ester | 75.00% |

Example 3

The mixture from Example 1 is mixed with a roofing asphalt at a concentration of 1 gallon of the mixture per 6,000 gallons of asphalt, the temperature of the asphalt being 400° F. (204° C.).

Example 4

The mixture from Example 2 is mixed with a roofing asphalt at a concentration of 1 gallon of the mixture per 6,000 gallons of asphalt, the temperature of the asphalt being 420° F. (216° C.).

Example 5

The mixture from Example 1 is mixed with a paving asphalt at a concentration of 1 gallon of the mixture per 12,000 gallons of asphalt, the temperature of the asphalt being 320° F. (160° C.).

Example 6

The mixture from Example 2 is mixed with a paving asphalt at a concentration of 1 gallon of the mixture per 12,000 gallons of asphalt, the temperature of the asphalt being 320° F. (160° C.).

While the invention has been explained in relation to its various embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A composition made by mixing (A) roofing asphalt with (B) an odor-suppressing amount of an additive composition comprising soy methyl ester, at least one aldehyde and/or at least one ketone, and at least one carboxylic acid ester in addition to the soy methyl ester, the concentration of the soy methyl ester in (B) being in the range from about 30% to about 90% by weight of the additive composition (B): the concentration of (B) in (A) being in the range from about 0.1 to about 20 gallons of (B) per 6000 gallons of (A), the mixing being conducted at a temperature in the range from about 350° F. to about 480° F.

2. The composition of claim 1 wherein the additive composition (B) is mixed with the hydrocarbonaceous material (A) at a temperature in the range from about 380° F. to about 400° F.

3. The composition of claim 1 wherein the soy methyl ester is present in the additive composition (B) in an amount ranging from about 45 to about 80% by weight of the additive composition; the aldehyde and/or ketone is present in the additive composition (B) in an amount ranging from about 10 to about 50% by weight of the additive composition; and the carboxylic acid ester is present in the additive composition (B) in an amount ranging from about 1 to about 30% by weight of the additive composition.

4. The composition of claim 1 wherein the carboxylic acid ester is a compound represented by the formula

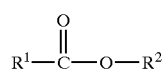

(III)

wherein in formula (III), $R^1$ and $R^2$ independently are hydrocarbyl groups or hydroxy substituted hydrocarbyl groups.

5. The composition of claim 1 wherein the ketone is a compound represented by the formula

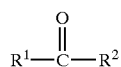

wherein in formula (II), $R^1$ and $R^2$ independently are hydrocarbyl groups or hydroxy substituted hydrocarbyl groups, or $R^1$ and $R^2$ are linked together to form a cyclic group or a hydroxy-substituted cyclic group.

6. The composition of claim 1 wherein the aldehyde is a compound represented by the formula

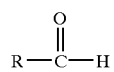

wherein in formula (I), R is hydrogen, a hydrocarbyl group or a hydroxy substituted hydrocarbyl group.

7. The composition of claim 1 wherein the asphalt comprises petroleum tar, asphalt cement, or a mixture thereof.

8. The composition of claim 1 wherein the asphalt comprises straight asphalt obtained by distillation of a crude oil, blown asphalt produced by blowing an oxygen-containing gas into a straight asphalt, solvent-extracted asphalt obtained from a petroleum fraction, cut-back asphalt, or a mixture of two or more thereof.

9. The composition of claim 1 wherein the asphalt comprises asphaltite, lake asphalt, rock asphalt, or a mixture of two or more thereof.

10. The composition of claim 1 wherein the asphalt comprises natural asphalt, petroleum asphalt, or a mixture thereof.

* * * * *